United States Patent [19]

Sekiguchi et al.

[11] 4,349,077
[45] Sep. 14, 1982

[54] ELECTRIC CONTROL DEVICE FOR VEHICLE SUSPENSION SYSTEM

[75] Inventors: Tomoyoshi Sekiguchi, Atsugi; Hiroya Ishikawa, Zama, both of Japan

[73] Assignee: Atsugi Motor Parts Co., Ltd., Kanagawa, Japan

[21] Appl. No.: 228,297

[22] Filed: Jan. 26, 1981

Related U.S. Application Data

[63] Continuation-in-part of Ser. No. 78,820, Sep. 25, 1979, abandoned.

[30] Foreign Application Priority Data

Oct. 2, 1978 [JP] Japan ................................. 53-121860

[51] Int. Cl.³ .......................................... B60G 21/006
[52] U.S. Cl. ..................................... 180/41; 280/6 H; 280/707; 307/10 R; 307/118
[58] Field of Search ....................... 280/6 R, 6 H, 6.11, 280/6.1, 707; 307/10 BP, 10 R, 118; 361/194, 195, 199; 180/41

[56] References Cited

U.S. PATENT DOCUMENTS

| 3,873,123 | 3/1975 | Joneleit | 280/707 |
| 4,076,275 | 2/1978 | Hirema | 280/707 |
| 4,105,216 | 8/1978 | Graham | 280/6 R |
| 4,137,492 | 1/1979 | Schultz | 280/6 R |
| 4,164,664 | 8/1979 | Kasiewicz | 280/707 |
| 4,185,845 | 1/1980 | Misch | 280/6 H |

*Primary Examiner*—Joseph F. Peters, Jr.
*Assistant Examiner*—M. J. Hill
*Attorney, Agent, or Firm*—Lowe, King, Price & Becker

[57] ABSTRACT

An electric vehicle-level control device is provided for controlling an electrically operated fluid pressure control device for a pneumatic, hydraulic or hydropneumatic suspension unit such as a hydro-pneumatic suspension strut of a self-levelling suspension system for an automotive vehicle. The control device comprises a timing or delay circuit adapted to deliver an output signal at a predetermined retarded timing following generation of (1) a signal responsive to a vehicle level higher or lower than a predetermined value, or (2) a signal responsive to shutdown of a power plant such as an internal combustion engine of an automotive vehicle.

8 Claims, 2 Drawing Figures

ELECTRIC CONTROL DEVICE FOR VEHICLE SUSPENSION SYSTEM

This application is a continuation-in-part of Ser. No. 078,820, filed Sept. 25, 1979 now abandoned.

FIELD OF THE INVENTION

The present invention relates to automotive vehicle systems and, particularly, a vehicle suspension system of the type using a self-levelling suspension unit such as a pneumatic, hydraulic or hydro-pneumatic suspension strut. More particularly, the present invention is concerned with an electric control device for the fluid pressure control valve or valves for the self-levelling suspension unit of an automotive suspension system.

BACKGROUND OF THE INVENTION

A self-levelling suspension system for an automotive vehicle is arranged to automatically lift or lower the vehicle body over a road surface depending upon the suspended weight of the vehicle. The self-levelling suspension system is operated in a pneumatic, hydraulic or hydro-pneumatic fashion and is controlled by a fluid pressure control valve adapted to adjust the level of the vehicle body to a predetermined value. The control valve per se is operated mechanically and is, for this reason, not adapted to produce sufficiently delayed actions. When, therefore, the suspended weight of the vehicle changes as a result of, for example, a change in the number of the occupants of the vehicle, the self-levelling suspension system tends to cause the vehicle to rise or lower excessively. This will cause an inconvenience to the vehicle occupant stepping out of a standing vehicle. The present invention contemplates elimination of such a problem caused by a prior art control device for the self-levelling suspension system of an automotive vehicle.

SUMMARY OF THE INVENTION

In accordance with the present invention, there is provided, in an automotive suspension system including a fluid-operated self-levelling suspension unit and an electrically controlled fluid pressure control valve for the suspension unit, an electrical level control device. The device comprises level detecting means responsive to variation in the level of a vehicle body over a road surface for producing a signal in response to a vehicle level higher or lower than a predetermined level, and a control circuit responsive to the signal from the detecting means and electrically connected to the control valve for controlling the valve on the basis of the signal. The control circuit comprises timing means operative to deliver an output signal at a predetermined retarded timing after the signal from the detecting means is fed to the control circuit. The level control device may further comprise first switch means controlling starting or stopping of the power plant of an automative vehicle, second switch means operable independently of the first switch means and connected in parallel with the first switch means between a power source and the aforesaid control circuit, and a delay circuit having an input terminal responsive to the first switch means and a output terminal connected to control the second switch means

DESCRIPTION OF THE PREFERRED EMBODIMENT

Figure 1:
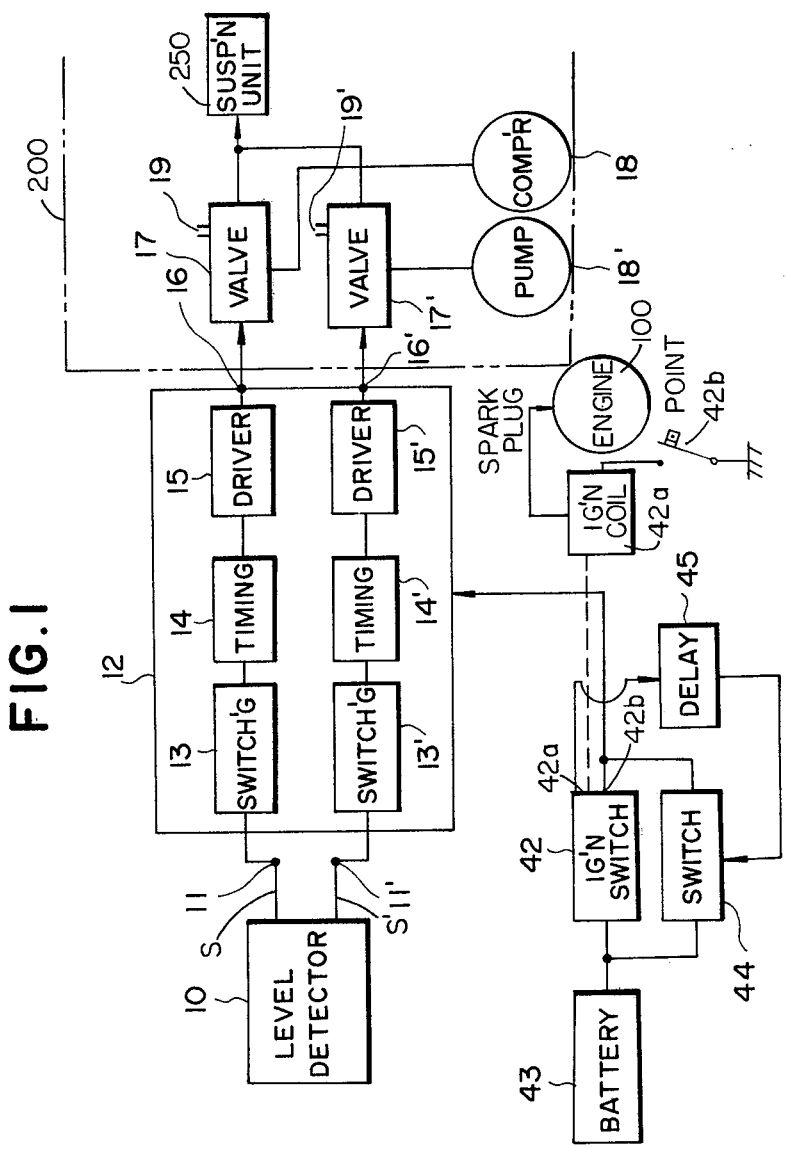
FIG. 1 is a block diagram showing a preferred embodiment of the device according to the present invention.

Referring to the drawings, particularly to FIG. 1, a vehicle comprises an engine 100, a battery 43 and a conventional ignition switch 42 which comprises an ignition coil 42A for energizing at least one spark plug (not shown) in response to opening and closing at proper times of a standard point 42B. An electric vehicle-level control device embodying the present invention comprises a vehicle level detector 10 adapted to detect the height of a suspended part of a vehicle body (not shown) over a road surface and to produce a first output signal S when the detected level of the vehicle body is higher than a predetermined value and a second output signal S' when the detected vehicle level is lower than the predetermined value. The level detector 10 has two output terminals 11 and 11' through which the first and second output signals S and S' of the level detector 10 are fed to a transistorized control circuit 12. The control circuit 12 consists essentially of first and second switching circuits 13 and 13', first and second timing circuits 14 and 14', and first and second driver circuits 15 and 15'.

The first and second switching circuits 13 and 13' have respective input terminals connected to the output terminals 11 and 11', respectively, of the level detector 10 and are thus supplied with the first and second output signals S and S', respectively, of the level detector 10. Each of the switching circuits 13 and 13' is responsive to the signal appearing at its input terminal and is shiftable between first and second conditions depending upon the absence or presence of a signal S or S' at the output terminal 11 or 11' of the level detector 10. For purposes of description, it is herein assumed by way of example that each of the switching circuits 13 and 13' assumes the first condition thereof in the absence of a signal S or S' at the output terminal 11 or 11', respectively, of the level detector 10 and the second condition thereof in response to a signal S or S' appearing at the output terminal 11 to 11', respectively, of the level detector 10. The first timing circuit 14 is responsive to the first and second conditions of the first switching circuit 13 and remains inoperative when the first switching circuit 13 is in the first condition thereof. Likewise, the second timing circuit 14' is responsive to the first and second conditions of the second switching circuit 13' and remains inoperative when the second switching circuit 13' is held in the first condition thereof. When the first switching circuit 13 is brought into the second condition thereof, the first timing circuit 14 is made operative to deliver an output signal at a timing which is retarded from the point of time at which the timing circuit 14 is actuated by the first switching circuit 13. When, similarly, the second switching circuit 13' is brought into the second condition thereof, the second timing circuit 14' is made operative to deliver an output signal upon lapse of a certain amount of the time delay. The output signals thus delivered from the first and second timing circuits 14 and 14' are supplied to the input terminals of the first and second driver circuits 15 and 15', respectively, for actuating the driver circuits.

The driver circuits 15 and 15' have output terminals 16 and 16' which are connected to the coils of first and second solenoid-operated fluid pressure control valves 17 and 17', respectively. Each of the control valves 17 and 17' forms part of a fluid circuit of a pneumatic, hydraulic or hydro-pneumatic self-levelling suspension system 200 for an automotive vehicle and intervenes, in effect, between a suitable source of fluid under pressure such as a hydraulic pump or an air compressor and a suitable pneumatically, hydraulically or hydro-pneumatically operated, self-levelling suspension unit 250 such as, for example, a hydro-pneumatic syspension strut (not shown). Where a hydro-pneumatic self-levelling suspension strut is used as the suspension unit, the first solenoid-operated fluid pressure control valve 17 may be arranged to control the pressure of air supplied from an air compressor 18 and may be provided with a discharge port 19 for discharging an excess of air pressure therethrough when the valve 17 is energized. On the other hand, the second solenoid-operated fluid pressure control valve 17' may be arranged to control the pressure of hydraulic oil supplied from a hydraulic oil pump 18 and may be provided with a discharge port 19' for discharging an excess of oil pressure therethrough when the valve 17' is energized.

Figure 2:
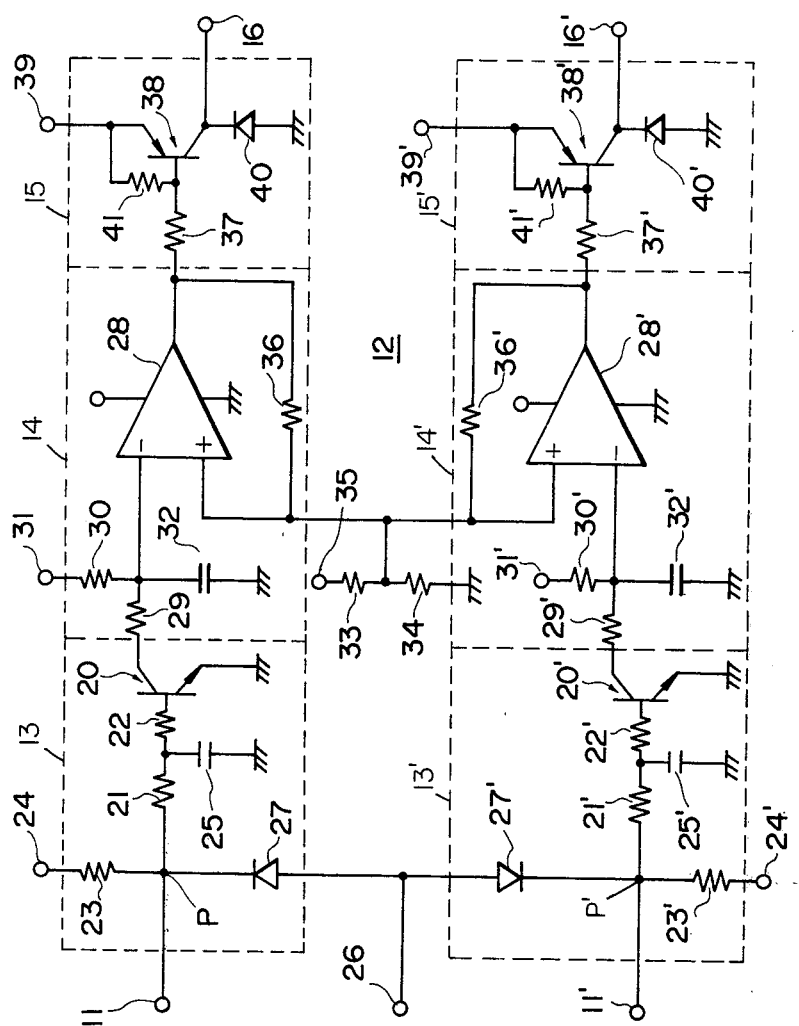
FIG. 2 is a circuit diagram showing details of a control circuit forming part of the embodiment illustrated in FIG. 1.

FIG. 2 shows a preferred example of the detailed circuit arrangement of the control circuit 12 forming part of the device hereinbefore described with reference to FIG. 1.

Referring to FIG. 2, the first switching circuit 13 comprises a transistor 20 having its base connected via a series combination of two resistors 21 and 22 to the first output terminal 11 of the vehicle level detector 10 shown in FIG. 1. The base of the transistor 20 is further connected through the resistors 21 and 22 and further through a resistor 23 to a constant voltage supply terminal 24. The emitter of the transistor 20 is grounded. The switching circuit 13 further comprises a capacitor 25 having one electrode connected to ground and the other electrode connected to a junction between the resistors 21 and 22, viz., connected to the base of the transistor 20 through the resistor 21. The second switching circuit 13' is constructed and arranged similarly to the first switching circuit 13 and, thus, comprises a transistor 20', resistors 21', 22' and 23', a constant voltage supply terminal 24' and a capacitor 25'. A test-point terminal 26 is provided which is connected through a diode 27 to a junction P between the resistors 21 and 23 of the first switching circuit 13 and through a diode 27' to a junction P' between the resistors 21' and 23' of the second switching circuit 13'. The diodes 27 and 27' are arranged in such a manner as to have their respective anode terminals jointly connected to the test-point terminal 26 and their cathode terminals connected to the junction points P and P', respectively, as shown.

The collector of the transistor 20 in the first switching circuit 13 is connected to a comparator 28 which forms part of the first timing circuit 14. The comparator 28 has a negative input terminal connected through a resistor 29 to the collector of the transistor 20 in the first switching circuit 13 and through a resistor 30 to a constant voltage supply terminal 31. The negative input terminal of the comparator 28 is further connected to ground across a capacitor 32. The comparator 28 further has a positive input terminal connected to a junction between a series combination of voltage dividing resistors 33 and 34. The voltage dividing resistors 33 and 34 are provided in common to the first and second timing circuits 14 and 14' and are connected between ground and a constant voltage supply terminal 35. The comparator 28 has an output terminal connected through a feedback resistor 36 to the positive input terminal of the comparator 28. The second timing circuit 14' is constructed and arranged similarly to the above described first timing circuit 14 and, thus, comprises a comparator 28', resistors 29' and 30', a constant voltage supply terminal 31', a capacitor 32' and a resistor 36' as shown. Each of the comparators 28 and 28' is operative to compare with each other the voltages appearing at the positive and negative input terminals thereof and to deliver a signal from its output terminal when the voltage appearing at the negative input terminal higher in magnitude than the voltage appearing at the positive input terminal, viz., the voltage determined by the ratio between the voltage dividing resistors 33 and 34.

The output terminal of the comparator circuit 28 in the first timing circuit 14 is further connected through a resistor 37 to the base of a transistor 38 which forms part of the first driver circuit 15. The transistor 38 has its emitter connected to a constant voltage supply terminal 39 and its collector connected to ground through a diode 40 which is arranged to have its anode terminal grounded and its cathode terminal connected to the collector of the transistor 38. The base and emitter electrodes of the transistor 38 are interconnected by a resistor 41. The second driver circuit 15' is constructed and arranged similarly to the above described first driver circuit 15 and, thus, comprises a resistor 37', a transistor 38', a constant voltage supply terminal 39', a diode 40' and a resistor 41', as shown. The collector electrodes of the transistors 38 and 38' of the first and second driver circuits 15 and 15' are connected to the previously mentioned output terminals 16 and 16', respectively, of the driver circuits 15 and 15'.

Each of the constant voltage supply terminals 24, 24', 31, 31', 35, 39 and 39' included in the control circuit 12 thus constructed and arranged is connected to a suitable constant voltage supply circuit (not shown). The constant voltage supply circuit is, in turn, connected to a suitable d.c. power source across suitable switch means responsive to or causative of the start and stop of an automotive power plant such as an internal combustion engine. In FIG. 1, such switch means is assumed to be constituted by an ignition switch 42 for automotive internal combustion engine 100 and is connected between the control circuit 12 and the battery 43 for the ignition system of the internal combustion engine.

When, in operation, the level of the vehicle body over a road surface becomes higher than the predetermined value stored in the level detector 10 (FIG. 1), a signal S is delivered from the level detector 10 to the first switching circuit 13 and causes reduction in the potential at the junction P between the resistors 21 and 23 in the switching circuit 13. This makes the transistor 20 non-conductive and causes the capacitor 32 of the first timing circuit 14 to be charged from the constant voltage supply terminal 31 through the resistor 30. When the capacitor 32 becomes fully charged and thereby the voltage at the negative input terminal of the comparator 28 becomes higher than the voltage appearing at the positive input terminal of the comparator 28, the comparator 28 delivers an output signal and causes the transistor 38 of the first driver circuit 15 to turn on and pass a current from the constant voltage supply terminal 39 to the output terminal 16 of the driver circuit 15. The current thus passed to the output terminal 16 of the first driver circuit 15 is fed to the coil of the first solenoid-operated fluid pressure control valve 17 and causes the valve 17 to discharge fluid through the discharge port 19 thereof, thereby permitting the self-levelling suspension unit to lower the vehicle body to the predetermined level registered in the level detector 10 (FIG. 1).

If, on the other hand, the level of the vehicle body over a road surface is lower than the predetermined value, the level detector 10 delivers a signal S' to the second switching circuit 13' and thereby actuates the second timing and driver circuits 14' and 15' in manners similar to those described in respect of the first switching, timing and driver circuits 13, 14 and 15. This causes the second solenoid-operated fluid pressure control valve 17' to discharge fluid through the discharge port 19' thereof and permits the self-levelling suspension unit to raise the vehicle body to the predetermined level registered in the level detector 10. In the presence of a signal S' at the second output terminal 11' of the level detector 10, the potential at the junction P between the resistors 21 and 23 of the first switching circuit 13 is maintained at a relatively high level in the absence of a signal S at the first output terminal 11 of the level detector 10 so that the transistor 20 of the switching circuit 13 is held in a conduction state. The current supplied from the constant voltage supply circuit 31 of the first timing circuit 14 is therefore passed to ground through the resistors 30 and 29 of the timing circuit 14 and the collector and emitter electrodes of the transistor 20 of the switching circuit 13. The voltage at the negative input terminal of the comparator 28 in the first timing circuit 14 being thus lower in magnitude than the voltage appearing at the positive input terminal of the comparator 28, the transistor 38 of the first driver circuit 15 is maintained in a non-conductive state in the absence of a signal at the output terminal of the comparator 28. There being no electric current passed to the output terminal 16 of the first driver circuit 15, the first solenoid-operated fluid pressure control valve 17 is held in a condition closing the discharge port 19 thereof so that the fluid pressure directed to the self-levelling suspension unit by way of the control valve 17 is maintained unchanged. The lowering of the vehicle body is, thus, effected solely by the second solenoid-operated fluid pressure control valve 17' without having recourse to actuation of the first solenoid-operated fluid pressure control valve 17.

The level of a vehicle body over a road surface is thus automatically adjusted to remain at a predetermined value by selective or alternate actuation of the first and second solenoid-operated fluid pressure control valves 17 and 17'. In accordance with the present invention, such a function is achieved not only when the ignition switch 42 is closed but for a predetermined period of time after the ignition switch 42 is opened. For this purpose, the ignition switch 42 is shunted by a normally-open switch 44 which is adapted to be actuated to close by a suitable delay circuit 45 having an output terminal connected to the normally-open switch 44.

The input terminal of delay circuit 45 is connected to an auxiliary, low current output terminal 42a of the ignition switch 42 which is normally open and tracks the state of the ignition switch means output terminal 42b, i.e., the delay circuit 45 is triggered by output 42a when the ignition switch 42 is opened. Delay circuit 45 is not, however, responsive to the opening of switch 44. When the ignition switch 42 is opened, the delay circuit 45 is initiated to close the switch 44 and maintains the switch 44 closed for a predetermined period of time dictated by the delay circuit 45 Thus, the switch 44 maintains a conducting path bypassing the ignition switch 42 for the predetermined period of time after the ignition switch 42 is opened.

When the occupants of a standing vehicle alight from the vehicle, the self-levelling suspension unit responds to the reduction in the suspended weight of the vehicle and tends to raise the vehicle body. If, in this instance, the control circuit 12 is made inoperative immediately when the ignition switch 42 is opened, the occupants stepping out of the vehicle will experience an inconvenience resulting from the suddenly increased height of the vehicle body over the road surface. Such an inconvenience is avoided in a vehicle provided with the arrangement according to the present invention because the control circuit 12 is kept energized from the battery 43 through the switch 44 and as a consequence the level of the vehicle body over the road surface is automatically adjusted to a predetermined value for a predetermined period of time after the ignition switch 42 is opened.

What is claimed is:

1. In a vehicle comprising an engine, a battery, an ignition switch and a vehicle suspension system including a fluid-operated self-levelling suspension unit, an electrically controlled fluid pressure control valve for the suspension unit, and an electric vehicle-level control device for producing an output for actuating the fluid pressure control valve, said electric vehicle-level control device comprising:
    (a) level detecting means responsive to variation in the level of a vehicle body over a road surface for producing a signal in response to a vehicle level higher or lower than a predetermined level,
    (b) control circuit means responsive to the signal from said detecting means and controlling said valve on the basis of said signal, said control circuit means including a timing means for generating an output signal at a predetermined time after the signal from the detecting means is fed to the control circuit, and
    (c) a battery energy feeding circuit responsive to said ignition switch to supply energy stored in said battery to said control circuit means, said battery energy feeding circuit comprising switching means for selectively supplying battery energy to the control circuit means, and an off-delay circuit responsive to said ignition switch to produce a command for maintaining said switching means closed for a predetermined time period following an opening of said ignition switch.

2. A vehicle-level control device as set forth in claim 1, wherein:
    said ignition switch comprises first switch means controllable to start or stop the automotive vehicle engine;
    said switching means comprises second switch means operable independently of said first switch means and connected in parallel with the first switch means between said battery and said control circuit means;
    and said off-delay circuit includes an input terminal responsive to an auxiliary output of the first switching means and an output terminal connected to control said second switch means.

3. A vehicle-control device as set forth in claim 1 or 2, in which said timing means comprises a comparator having a first input terminal connected to said level detecting means, a second input terminal connected to a source of a predetermined voltage and an output terminal electrically connected to said control valve, and charge storage means connected to said first input terminal of said comparator.

4. A vehicle-level control device as set forth in claim 3, in which said control circuit further comprises switching means comprising a switching element having a control electrode connected to said level detecting means and a first constant voltage source, an input electrode connected to a second constant voltage source connected to said charge storage means and said first input terminal of said comparator, and an output electrode connected to ground.

5. A vehicle-level control device as set forth in claim 4, in which said switching element comprises a transistor having a base constituting said control electrode, a collector constituting said input electrode and an emitter constituting said output electrode.

6. A vehicle-level control device as set forth in claim 4 in which said charge storage means comprises a capacitor having one electrode connected to said second constant voltage source, the input electrode of said switching element and the first input terminal of said comparator, the other electrode of said capacitor being grounded.

7. A vehicle-level control device as set forth in claim 3, in which said control circuit further comprises a switching element having a control electrode connected to the output terminal of said comparator, an input electrode connected to a constant voltage source and an output electrode electrically connected to said control valve.

8. A vehicle-level control device as set forth in claim 7, in which said switching element comprises a transistor having a base constituting said control electrode, an emitter constituting said input electrode and a collector constituting said output electrode.

* * * * *